United States Patent [19]

Ji et al.

[11] Patent Number: 5,663,830
[45] Date of Patent: Sep. 2, 1997

[54] THIN FILM ACTUATED MIRROR ARRAY FOR USE IN AN OPTICAL PROJECTION SYSTEM AND METHOD FOR THE MANUFACTURE THEREOF

[75] Inventors: Jeong-Beom Ji; Yong-Ki Min, both of Seoul, Rep. of Korea

[73] Assignee: Daewoo Electronics Co., Ltd., Seoul, Rep. of Korea

[21] Appl. No.: 400,065

[22] Filed: Mar. 7, 1995

[30] Foreign Application Priority Data

Mar. 9, 1994 [KR] Rep. of Korea .......... 94-4519
Jun. 22, 1994 [KR] Rep. of Korea .......... 94-14155

[51] Int. Cl.⁶ ............................... G02B 26/00
[52] U.S. Cl. ............................... 359/295; 359/290
[58] Field of Search ........................ 359/290, 291, 359/295, 846, 848, 850

[56] References Cited

U.S. PATENT DOCUMENTS

4,954,789  9/1990  Sampsell .
5,062,689  11/1991  Koehler .
5,247,222  9/1993  Engle .
5,481,396  1/1996  Ji ........................... 359/295

*Primary Examiner*—Georgia Y. Epps
*Assistant Examiner*—John P. Cornely
*Attorney, Agent, or Firm*—Anderson Kill & Olick P.C.

[57] ABSTRACT

An array of M×N actuated mirrors comprises an active matrix, an array of M×N elastic members, an array of M×N pairs of actuating structures and an array of M×N mirrors. Each of the elastic members is provided with a distal and a proximal ends, the proximal end including a first and a second tab portions, the first tab and the second tab portions being separated by a retraction therebetween, the distal end including a protrusion. Each of the actuating structures is located on the first and the second tab portions on each of the elastic members, respectively. Each of the mirrors is formed on top of the elastic members. When the pair of actuating structures deform in response to an electrical signal, the first and the second tab portions tilt while the remainder of the elastic member, and, the mirror formed on top thereof, stays planar, thereby allowing all of the mirrors to reflect the light beams.

18 Claims, 8 Drawing Sheets

THIN FILM ACTUATED MIRROR ARRAY FOR USE IN AN OPTICAL PROJECTION SYSTEM AND METHOD FOR THE MANUFACTURE THEREOF

FIELD OF THE INVENTION

The present invention relates to an optical projection system; and, more particularly, to an array of M×N thin film actuated mirrors for use in the system and method for the manufacture thereof.

BACKGROUND OF THE INVENTION

Among the various video display systems available in the art, an optical projection system is known to be capable of providing a high quality display in a large scale. In such an optical projection system, light from, a lamp is uniformly illuminated onto an array of, e.g., M×N, actuated mirrors, wherein each of the mirrors is coupled with each of the actuators. The actuators may be made of an electrodisplacive material such as a piezoelectric or an electrostrictive material which deforms in response to an electric field applied thereto.

The reflected light beam from each of the mirrors is incident upon an aperture of, e.g., an optical baffle. By applying an electrical signal to each of the actuators, the relative position of each of the mirrors to the incident light beam is altered, thereby causing a deviation in the optical path of the reflected beam from each of the mirrors. As the optical path of each of the reflected beams is varied, the amount of light reflected from each of the mirrors which passes through the aperture is changed, thereby modulating the intensity of the beam. The modulated beams through the aperture are transmitted onto a projection screen via an appropriate optical device such as a projection lens, to thereby display an image thereon.

Figure 1:
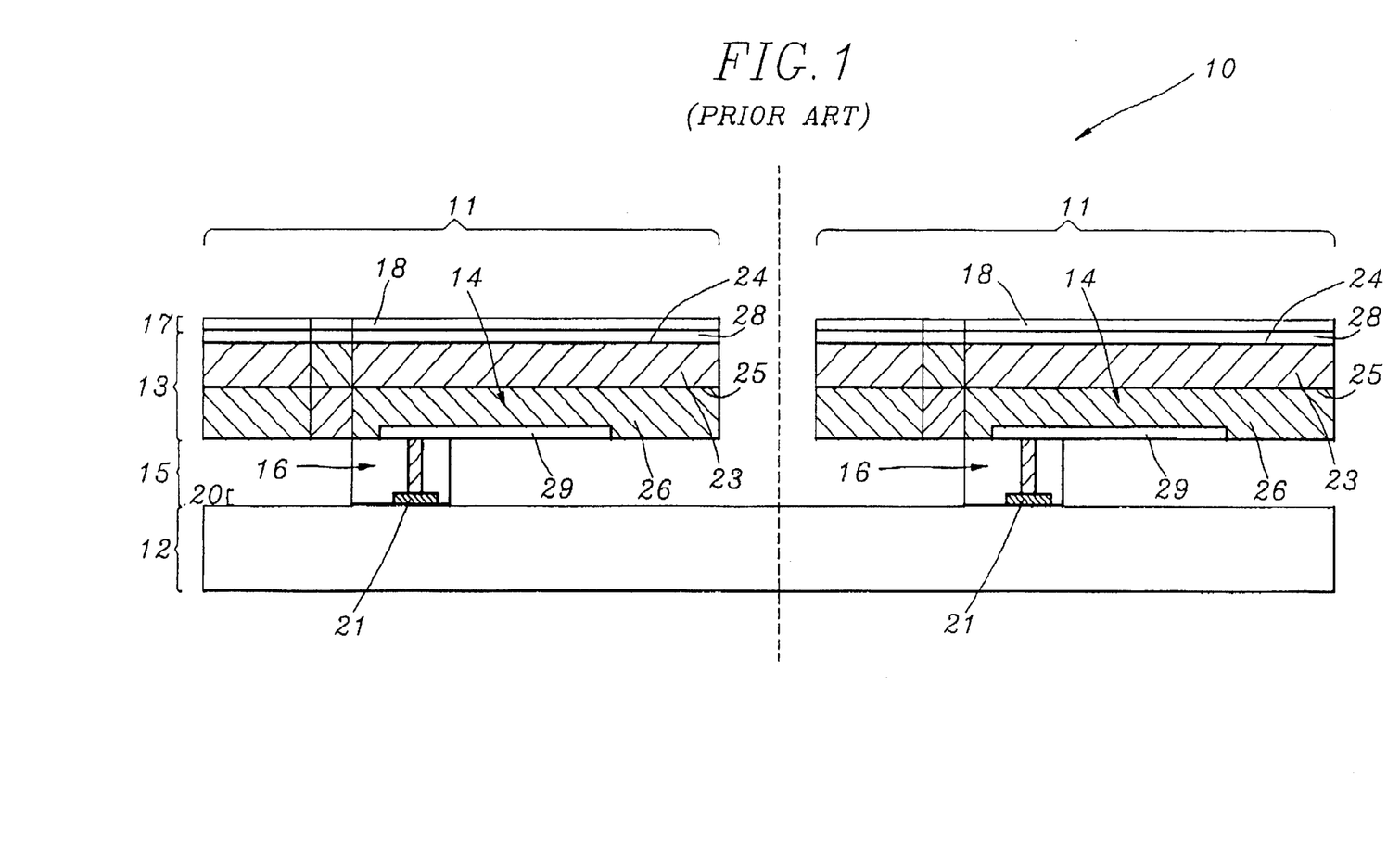
FIG. 1 shows a cross sectional view of an array of M×N thin film actuated mirrors previously disclosed.
Figure 2:
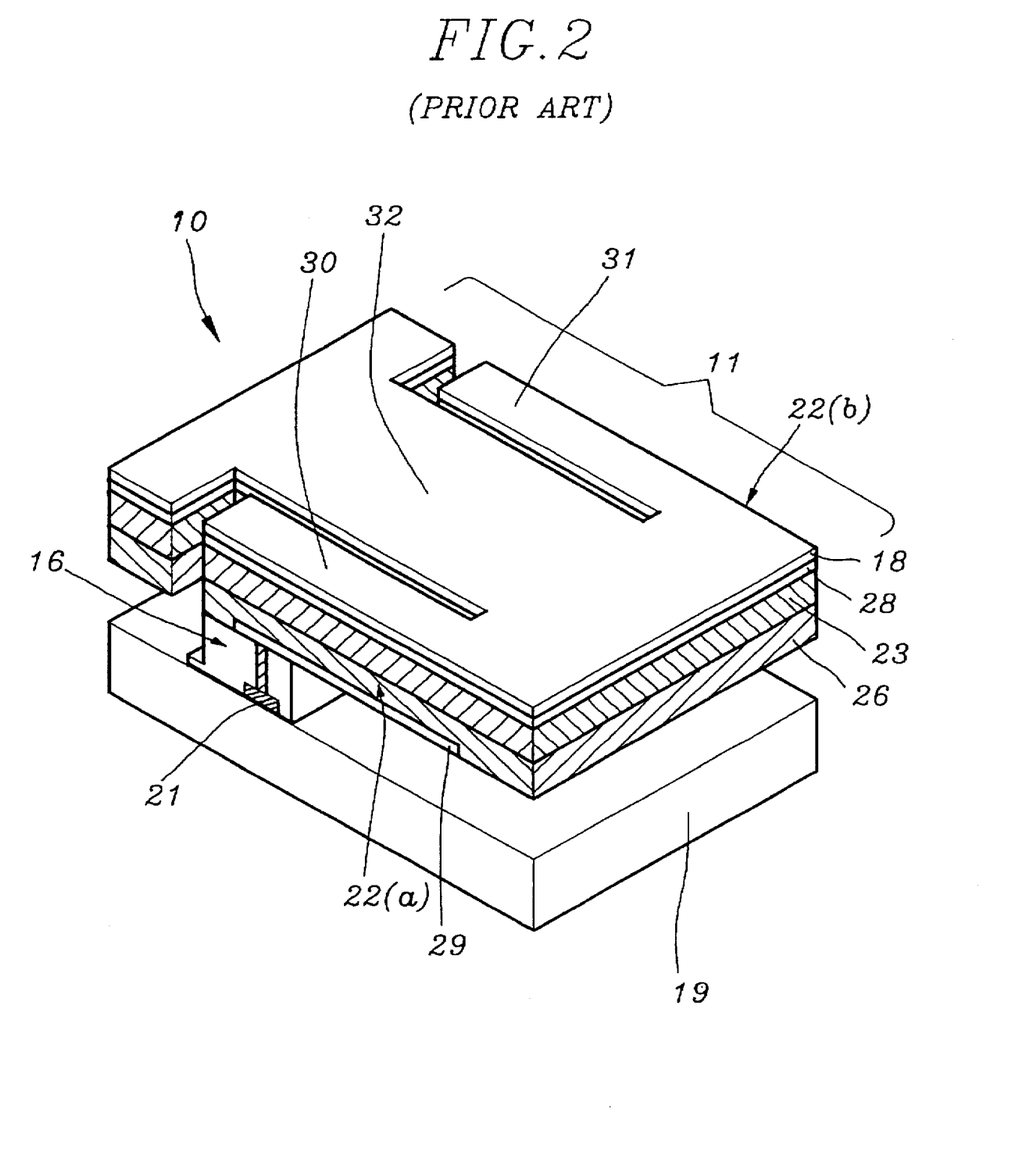
FIG. 2 discloses a perspective view of a thin film actuated mirror constituting the array shown in FIG. 1.

In FIGS. 1 and 2, there are shown a cross sectional and a perspective views, respectively, of an array 10 of M×N thin film actuated mirrors 11 for use in an optical projection system, disclosed in a copending commonly owned application, U.S. Ser. No. 08/340,762, entitled "ARRAY OF THIN FILM ACTUATED MIRRORS FOR USE IN AN OPTICAL PROJECTION SYSTEM AND METHOD FOR THE MANUFACTURE THEREOF", comprising an active matrix 12, an array 13 of M×N thin film actuating structures 14, an array 15 of M×N supporting members 16 and an array 17 of M×N mirror layers 18.

The active matrix 12 includes a substrate 19, an array of M×N transistors(not shown) and an array 20 of M×N connecting terminals 21. Each of the actuating structures 14 in the array 10 is provided with a first and a second actuating parts 22(a), 22(b), the first and second actuating parts 22(a), 22(b) being identically structured, wherein each of the first and second actuating parts 22(a), 22(b) has at least a thin film layer 23 of a motion-inducing material, e.g., piezoelectric material, including a top and a bottom surfaces 24, 25, an elastic layer 26, and a first and a second electrodes 28, 29. The elastic layer 26 is placed on the bottom surface 25 of the motion-inducing thin film layer 23. The first electrode 28 is located on the top surface 24 of the motion-inducing thin film layer 23, and the second electrode 29 is positioned at bottom of the elastic layer 26, wherein an electrical signal applied across the motion-inducing thin film layer 23 located between the first and second electrodes 28, 29 causes a deformation thereof, and hence the actuating parts 22(a), 22(b). Each of the supporting members 16 is used for holding each of the actuating structures 14 in place and also for electrically connecting each of the actuating structures 14 with the active matrix 12. Each of the mirror layers 18 includes a first side 30, a second opposing side 31, and a center portion 32 therebetween as shown in FIG. 2, wherein the first side 30 and the second opposing side 31 of each of the mirror layers 18 are secured on top of the first and second actuating parts 22(a), 22(b) of each of the actuating structures 14, respectively, such that when the first and second actuating parts 22(a), 22(b) in each of the actuating structures 13 deform in response to the electrical signal, the center portion 32 of the corresponding mirror layer 18 tilts while remaining planar, thereby allowing all of the center portion 32 to reflect the light beams, resulting in an increased optical efficiency.

There are a number of problems associated with the above-described thin film actuated mirror array 10. First of all, each of the actuating structures 14, and hence, the mirror layer 18 attached thereto, has a limited tilting angle. In the array 10, whenever each of the actuating structures 14 tilts upward by more than 3°, a part thereof is bound to come in contact with the active matrix 12, thereby limiting the performance thereof. In addition, since the second electrode 29 partially covers the bottom surface 25 of the motion-inducing layer 23 in each of the actuating parts 22(a), 22(b) in each actuating structure 14 to thereby leave portions of the motion-inducing layer 23 in a direct contact with the elastic layer 26 and the respective materials making up the elastic layer 26 and the motion inducing layer 23 are provided with different thermal expansion coefficients, an excessive level of stress may be developed between the motion-inducing layer 23 and the elastic layer 26, leading to an eventual separation thereof, which may, in turn, lead to the formation of cracks or unevenness on each of the mirror layers 18, thereby reducing the optical efficiency of the array 10.

SUMMARY OF THE INVENTION

It is, therefore, a primary object of the present invention to provide an array of M×N actuated mirrors having an increased tilting angle.

It is another object of the present invent to provide an array of M×N actuated mirrors having an increased optical efficiency.

If is a further object of the present invention to provide a method for manufacturing said array of M×N actuated mirrors.

In accordance with one aspect of the present invention, there is provided an array of M×N thin film actuated mirrors for use in an optical projection system, said array comprising: an active matrix including a substrate, an array of M×N transistors and an array of M×N pairs of connecting terminals, wherein the connecting terminals in each pair are electrically connected to each of the transistors; an array of M×N elastic members, each of the elastic members being provided with a distal and a proximal ends, and a top and a bottom surfaces, the proximal end including a first tab and a second tab portions, the first tab and second tab portions being separated by a retraction therebetween, the distal end including a protrusion, wherein the protrusion from each of the elastic members extends into the retraction of a successive elastic member in the array; an array of M×N pairs of actuating structures, each pair of the actuating structures being located on the first and second tab portions on each of the elastic members, respectively, each of the actuating structures including a bias electrode, a motion-inducing thin film layer and a signal electrode with the bias and the signal electrodes being placed on top and bottom of the motion-inducing thin film layer, respectively, the bias electrode being made of an electrically conducting, light reflecting material, the signal electrode in each of the actuating structures in each pair being electrically connected to a same transistor in the active matrix, wherein an electrical signal applied across the motion-inducing thin film layer between the bias and the signal electrodes in each of the actuating structures causes a deformation of the motion-inducing thin film layer, and hence, said each of the actuating structures; an array of M×N pairs of supporting members, each pair of the supporting members being used for holding each of the elastic members in place, wherein the first and second tab portions in each of the elastic members are secured to each of the supporting members in each pair, respectively; an array of M×N mirrors for reflecting light beams, each of the mirrors being formed on the top surface of the elastic member, each of the mirrors being made of the same material as the bias electrode, such that when the pair of actuating structures deform in response to the electrical signal, the first and second tab portions on the elastic member with the actuating structures attached thereto tilt while the remainder of the elastic member, and, hence, the mirror formed on top thereof, stays planar, thereby allowing all of the mirror in its entirety to reflect the light beams.

In accordance with another aspect of the present invention, there is provided a method for manufacturing an array of M×N thin film actuated mirrors for use in an optical projection system, said method comprising the steps of: a) providing an active matrix having a top surface, the active matrix including a substrate, an array of M×N transistors and an array of M×N pairs of connecting terminals on the top surface thereof; b) forming a sacrificial layer on the top surface of the active matrix in such a way that the sacrificial layer completely covers the array of M×N pairs of connecting terminals; c) removing the sacrificial layer surrounding each of the connecting terminals; d) forming a supporting member around each of the connecting terminals; e) depositing an elastic layer on top of the sacrificial layer and supporting members; f) forming an array of M×N pairs of conduits, each of the conduits extending from top of the elastic layer to each of the connecting terminals via each of the supporting members; g) providing an array of M×N pairs of signal electrodes on top of the elastic layer in such a way that each of the signal electrodes is in contact with each of the conduits and hence each of the connecting terminals; h) forming a motion-inducing thin film layer on top of each of the signal electrodes; i) depositing a layer made of an electrically conducting light reflecting material on top of the motion inducing and elastic layers to thereby form a semifinished array of actuated mirror structures; j) patterning the semifinished array of actuated mirror structures into an array of M×N actuated mirror structures, each of the actuated mirror structures including a pair of supporting members, a sacrificial layer, an elastic member with a pair of actuating structures and a mirror made of the electrically conducting, light reflecting material formed on top thereof, each of the actuating structures having a bias electrode made of the electrically conducting, light reflecting material, the motion-inducing thin film layer and the signal electrode, the elastic member further being provided with a distal and a proximal ends, and a top and bottom surfaces, the proximal end including a first tab and a second tab portions, the first and second tab portions being separated by a retraction therebetween, the distal end including a protrusion, each of the actuating structures being placed on top of the first and second tab portions, respectively, wherein the protrusion from each of the elastic members, and hence, the actuated mirror structures, extends into the retraction of a successive elastic member, and hence, a successive actuated mirror structure, in the array; and k) removing the sacrificial layer to thereby form said array M×N thin film actuated mirrors.

BRIEF DESCRIPTION OF THE DRAWINGS

The above and other objects and features of the present invention will become apparent from the following description of preferred embodiments given in conjunction with the accompanying drawings, wherein.

DETAILED DESCRIPTION OF THE PREFERRED EMBODIMENTS

Referring now to FIGS. 3 to 7, there are provided schematic cross sectional and top views of the inventive array of M×N thin film actuated mirrors for use in an optical projection system and method for the manufacture thereof, wherein M and N are integers, in accordance with preferred embodiments of the present invention. It should be noted that like parts appearing in FIGS. 3 to 7 are represented by like reference numerals.

Figure 3:
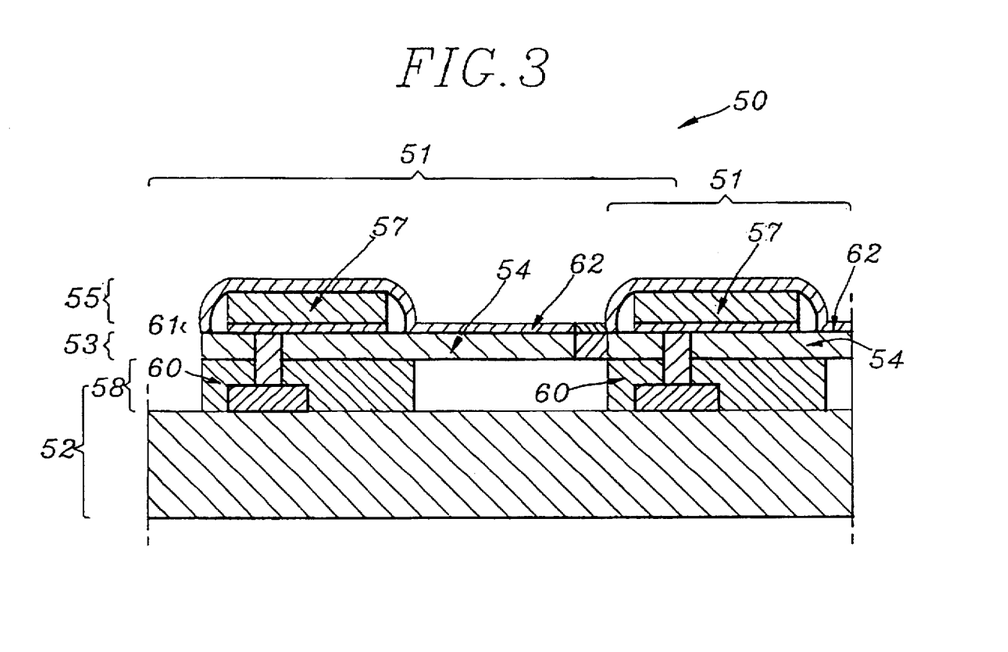
FIG. 3 represents a cross sectional view of an array of M×N thin film actuated mirrors in accordance with a preferred embodiment of the present invention.

In FIG. 3, there is illustrated a cross sectional view of a first embodiment of an array 50 of M×N thin film actuated mirrors 51, comprising an active matrix 52, an array 53 of M×N elastic members 54, an array 55 of M×N pairs of actuating structures 57, an array 58 of M×N pairs of supporting members 60 and an array 61 of M×N mirrors 62.

Figure 4:
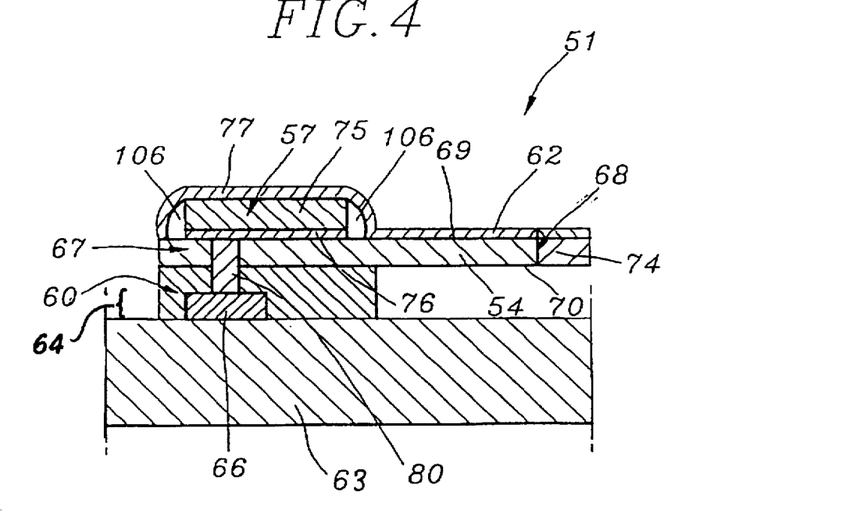
FIG. 4 depicts a detailed cross sectional view of a thin film actuated mirror constituting the array shown in FIG. 3.
Figure 5:
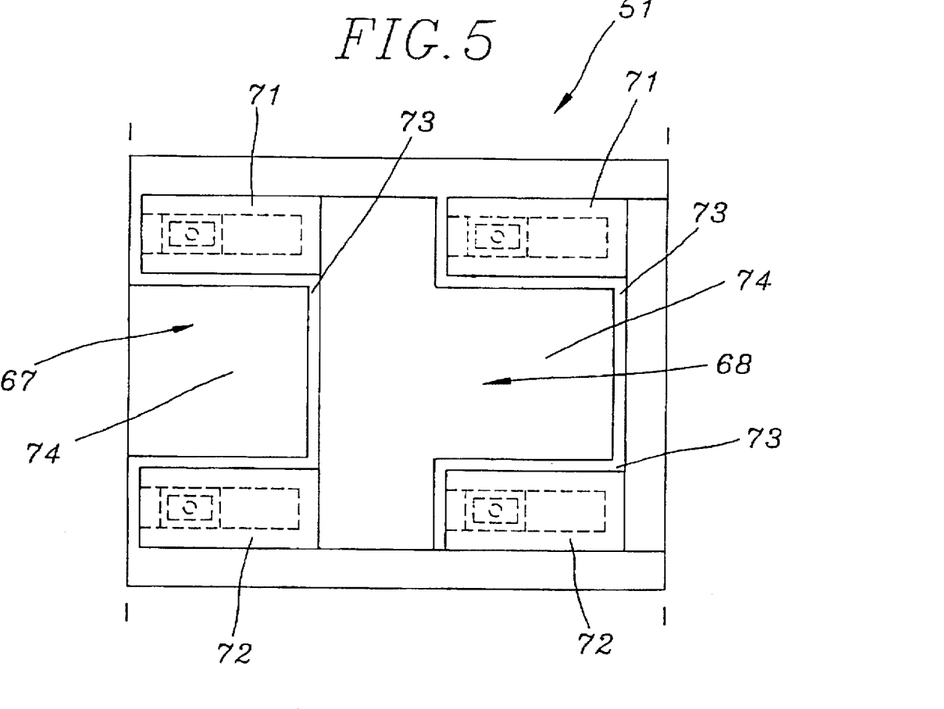
FIG. 5 illustrates a top view of the thin film actuated mirror shown in FIG. 3.

FIGS. 4 and 5 represent a detailed cross sectional and a top view of a thin film actuated mirror 51 constituting the array 50 shown in FIG. 3. The active matrix 52 includes a substrate 63, an array of M×N transistors(not shown) and an array 64 of M×N pairs of connecting terminals 66, wherein the connecting terminals 66 in each pair are electrically connected to each of the transistors. Each of the elastic members 54, having a thickness of 0.7–2 μm and made of a ceramic, e.g., $Si_3N_4$, $SiO_2$ or poly-Si, is provided with a distal and a proximal ends, 67, 68 and a top and a bottom surfaces 69, 70. The distal end 67 includes a first tab and a second tab portions 71, 72, the first and second tab portions being separated by a retraction 73 therebetween, and the proximal end 68 includes a protrusion 74, wherein the protrusion 74 from each of the elastic members 54 extends into the retraction 73 of a successive elastic members 54, as shown in FIG. 5.

Each of the actuating structures 57 in each pair is located on the first and second tab portions 71, 72 on each of the elastic members 54, respectively, and includes a bias electrode 77, a motion-inducing thin film layer 75 and a signal electrode 76 with the bias and signal electrodes 77, 76 being placed on top and bottom of the motion-inducing thin film layer 75. The bias electrode 77, having a thickness of 500–2000 Å, is made of an electrically conducting, light reflecting material, e.g., silver(Ag) or aluminum(Al), the signal electrode 76, having a thickness of 500–2000 Å, is made of an electrically conducting material, e.g., platinum (Pt) or platinum/titanium(Pt/Ti), and the motion-inducing thin film layer, having a thickness of 0.7–2 μm, is made of a piezoelectric material, e.g., barium titanate ($BaTiO_3$), or an electrostrictive material, e.g., lead magnesium niobate (PMN), respectively.

An insulation 106 formed around each of the signal electrodes 76 and the motion-inducing layer 75 on top thereof prevents the bias electrode 77 from coming in contact with the signal electrode 76. When an electrical signal is applied across the motion-inducing thin film layer 75 between the bias and signal electrode 77, 76 in each of the actuating structures 57, it results in a deformation of the motion-inducing thin film layer 75, and hence the actuating structure 57.

Each pair of supporting members 60, made of a ceramic, e.g., $Si_3N_4$, $SiO_2$ or poly-Si, is used for holding each of the elastic members 54 in place and also for electrically connecting the signal electrode 76 in each of actuating structures 57 on the elastic member 54 with the corresponding connecting terminal 66 on the active matrix 52. The first and second tab portions 71, 72 in each of the elastic members 54 are cantilevered from each of the supporting members 60 in each pair, respectively. Each of the supporting members 60 includes a conduit 80 for transmitting the electrical signal to the signal electrode 76, made of a metal, e.g., tungsten(W), and extending from the top of the elastic member 54 to the corresponding connecting terminal 66. The mirror 62 in each of the actuated mirrors 51 is made of the same material as the bias electrode 77 and is formed on top of the elastic member 54. In other word, the electrically conducting, light reflecting material deposited on the elastic member 54 functions as the bias electrode 77 and also as the mirror 62.

In each of the thin film actuated mirrors 51, each of the actuating structures 57 is located on top of the first and second tab portions 71, 72, respectively, such that when each of the actuating structures 57 deforms in response to the electrical signal, the tab portions 71, 72 with the actuating structures 57 attached on top thereof bend while the remainder of elastic member 54 remains planar thereby allowing all of the mirror 62 on top thereof to reflect the light beams.

Figure 6:
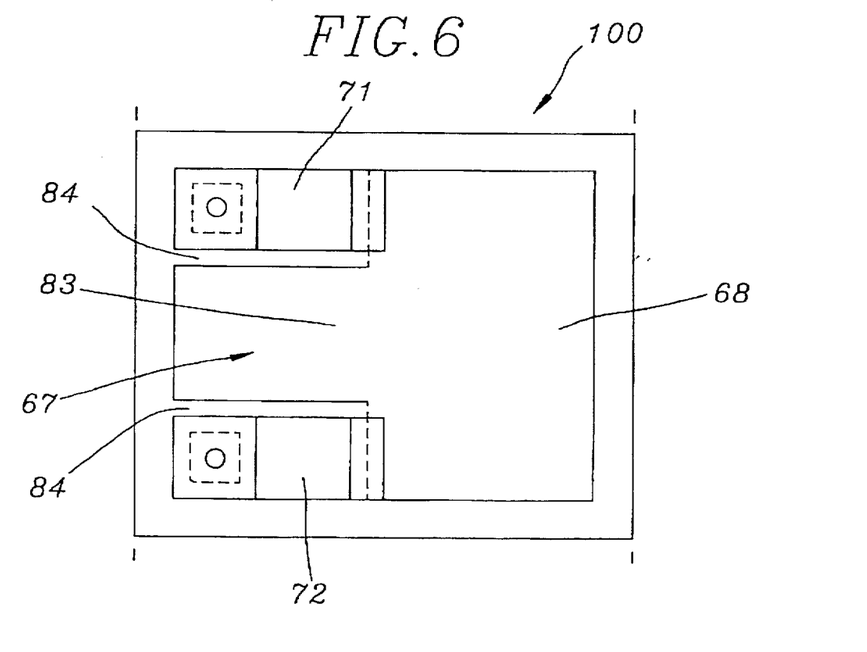
FIG. 6 presents a top view of an a thin film actuated mirror in accordance with another preferred embodiment of the present invention.

In FIG. 6, there is illustrated top view of a thin film actuated mirror 100 in accordance with another preferred embodiment of the present invention. The thin film actuated mirror 100 is similar to the thin film actuated mirrors 51 previously described except that it is provided with an elastic member 54 which is configurationally different, and hence, a mirror which is configurationally different. The elastic member 54 is provided with a first, a second and a center tab portions 71, 72, 83 at the distal end 67 thereof, wherein the first, second and center tab portions are separated by a gap 84 therebetween.

In the thin film actuated mirror 51 of the first embodiment or the thin film actuated mirror 100 of the second embodiment, a pair of actuating structures 57 are located only on the tab portions, and the mirror 62 is formed directly on the elastic mender 54, and therefore there is less likelihood of a stress developing and hence less likelihood of cracks forming on the mirror 62. Furthermore, since the pair of actuating structures 57 is located only on the tab portions 71, 72 of the elastic member 54 in the first embodiment or in the second embodiment, the actuated mirror 51, 100 in either embodiments will not come in contact with the active matrix 52, even if the actuated structures 57 bend upward by more than 3°.

Figure 7A:
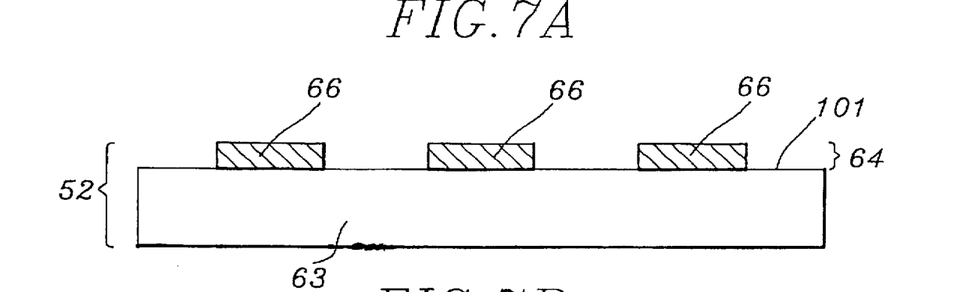
FIGS. 7A to 7J reproduce schematic cross sectional views setting forth the manufacturing steps for the first embodiment in accordance with the present invention.

There are illustrated in FIGS. 7A to 7J the manufacturing steps involved in manufacturing of the first embodiment of the present invention. The process for manufacturing the first embodiment, i.e., the array 50 of M×N thin film actuated mirrors 51, begins with the preparation of the active matrix 52 having a top surface 101, comprising the substrate 63, the array of M×N transistors(not shown) and the array 64 of M×N pairs of connecting terminals 66, as shown in FIG. 7A.

Figure 7B:
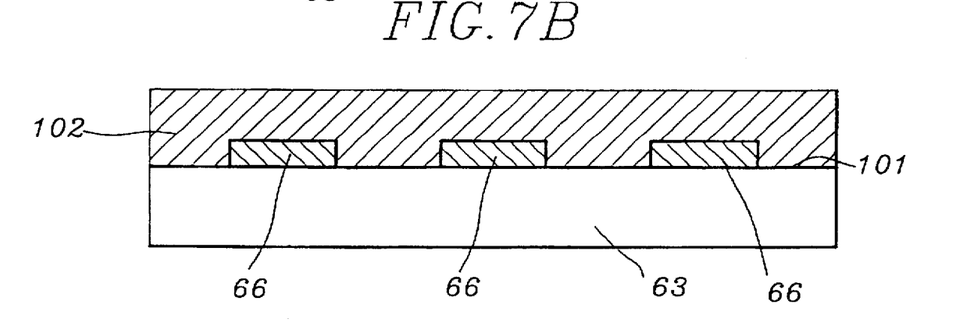

In the subsequent step, there is formed on the top surface 101 of the active matrix 52 a sacrificial layer 102, having a thickness of 1–2 μm and made of a metal, e.g., copper (Cu) or nickel(Ni), or phosphor-silicate glass(PSG) or poly-Si, by using a sputtering method if the sacrificial layer 102 is made of a metal, a chemical vapor deposition (CVD) or a spin coating method if the sacrificial layer 102 is made of PSG, and a (CVD) method if the sacrificial layer 102 is made of poly-Si, as illustrated in FIG. 7B.

Figure 7C:
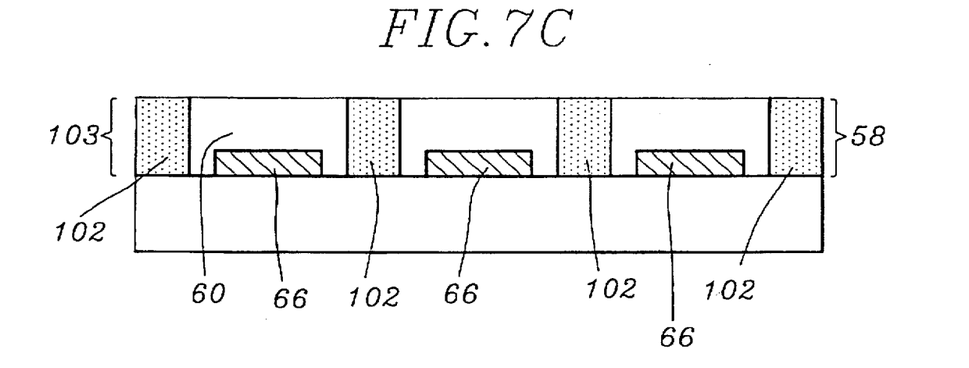

Subsequently, there is formed a first supporting layer 103 including the array 58 of M×N pairs of supporting members 60 and the sacrificial layer 102, wherein the first supporting layer 103 is formed by: forming an array of M×N pairs of empty slots (not shown) using a photilithography method, each of the empty slots being located around each of the connecting terminals 66; and forming a supporting member 60, made of a ceramic, e.g., $Si_3N_4$, $SiO_2$ or poly-Si, in each of the empty slots located around each of the connecting terminals 66, using a sputtering method or a CVD method, as shown in FIG. 7C.

Figure 7D:
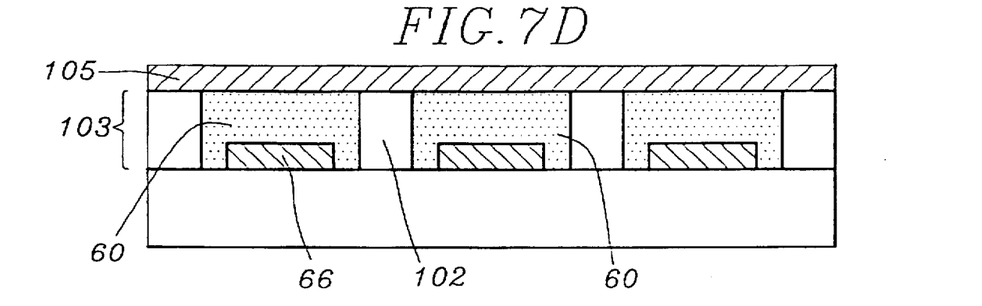

Thereafter, an elastic layer 105, made of the same material as the supporting member 60 and having a thickness of 0.7–2 μm, is formed on top of the first supporting layer 103, as depicted in FIG. 7D. It should be noted that the formation of the supporting members 60 and the elastic layer 105 can be combined in a single step. The sacrificial layer 102 in the first supporting member 103 is then treated as to be removable later by using an etching method or by applying appropriate chemicals.

Figure 7E:
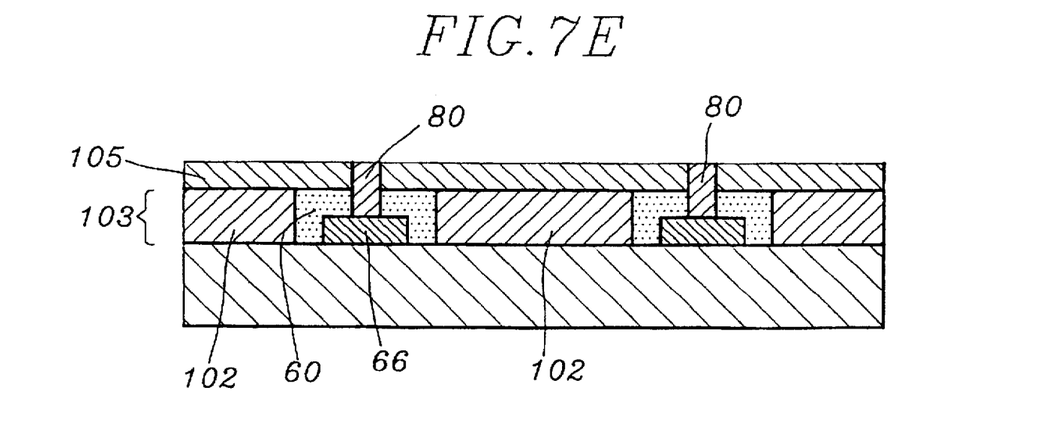

The conduit 80 for electrically connecting the signal electrode 76 in each of the actuating structures 57 with the corresponding connecting terminal 66, made of a metal, e.g., tungsten(W) or titanium(Ti), is formed in each of the supporting member 60 by first creating a hole extending from top of the elastic layer 105 to top of the respective connecting terminal 66, using an etching method, followed by filling therein with a metal, e.g., W, as depicted in FIG. 7E.

Figure 7F:
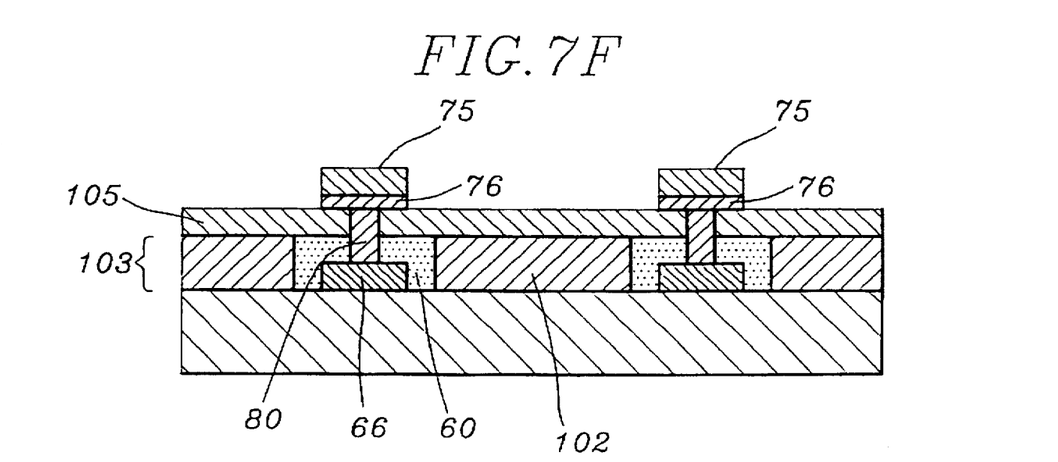

Subsequently, as shown in FIG. 7F, a signal electrode 76, made of an electrically conducting material, e.g., Pt, and having a thickness of 500–2000 Å, is formed on top of each conduit 80 using a sputtering method. Each of the signal electrodes 76 is electrically connected to each of the connecting terminals 66 through the conduit 80. In the subsequent step, a thin film motion-inducing layer 75, made of a piezoelectric material, e.g., $BaTiO_3$, or an electrostrictive material, e.g., PMN and having a thickness of 0.7–2 μm, is formed on top of each of the signal electrodes 76 using a sol-gel method or a sputtering method, and then it is heat treated to allow a phase transition thereof to take place. Since the motion-inducing thin film layer 75 is sufficiently thin, there is no need to pole it: it can be poled with the electrical signal applied during the operation thereof.

Figure 7G:
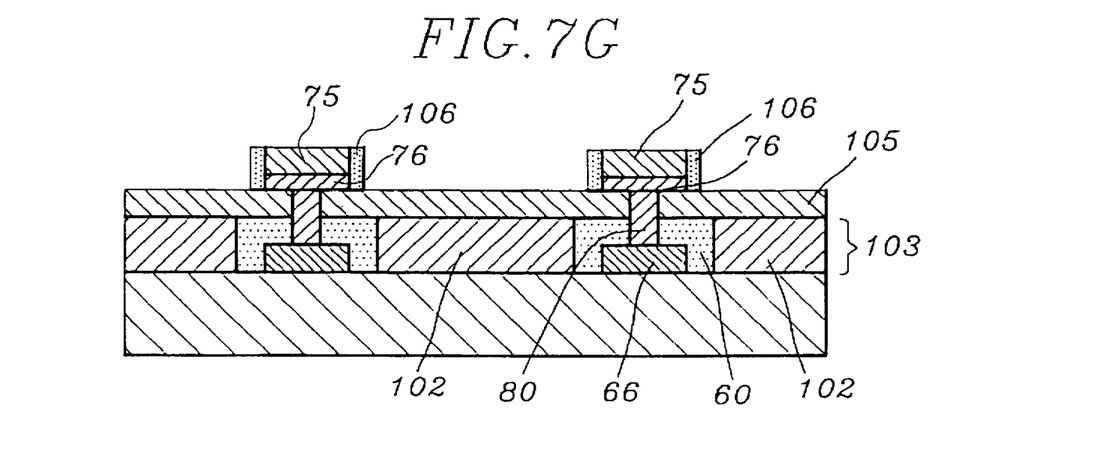
Figure 7H:
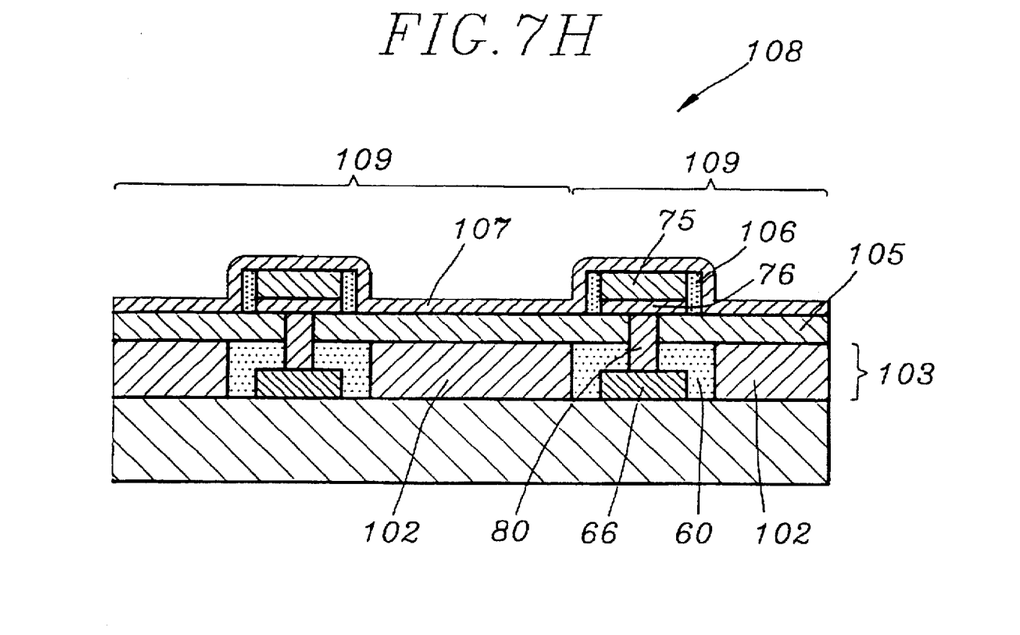

Thereafter, each of the signal electrode 76 and the motion-inducing thin film layer 75 formed on top thereof are covered with the same material as the elastic layer 105, and portion thereof is then removed to expose top of the motion inducing layer 76, thereby forming an insulation 106 around each of the signal electrodes 76 and the motion-inducing layer 75 formed thereon, as depicted in FIG. 7G.

Subsequently, a layer 107 made of an electrically conducting, light reflecting material, e.g., Al, and having a thickness of 500–1000 Å, is formed on top of the motion-inducing and elastic layers 75, 105 to form a semifinished array 108 of actuated mirror structures 109 using a sputtering or a vacuum evaporation method. This layer will function as the bias electrode 77 and mirror 62 in the thin film actuated mirror 51, as shown in FIG. 4. The insulation 106 formed around each of the signal electrodes 76 and the motion-inducing layer 75 on top thereof prevent the bias electrode 77 from coming in contact with the signal electrode 76.

Figure 7I:
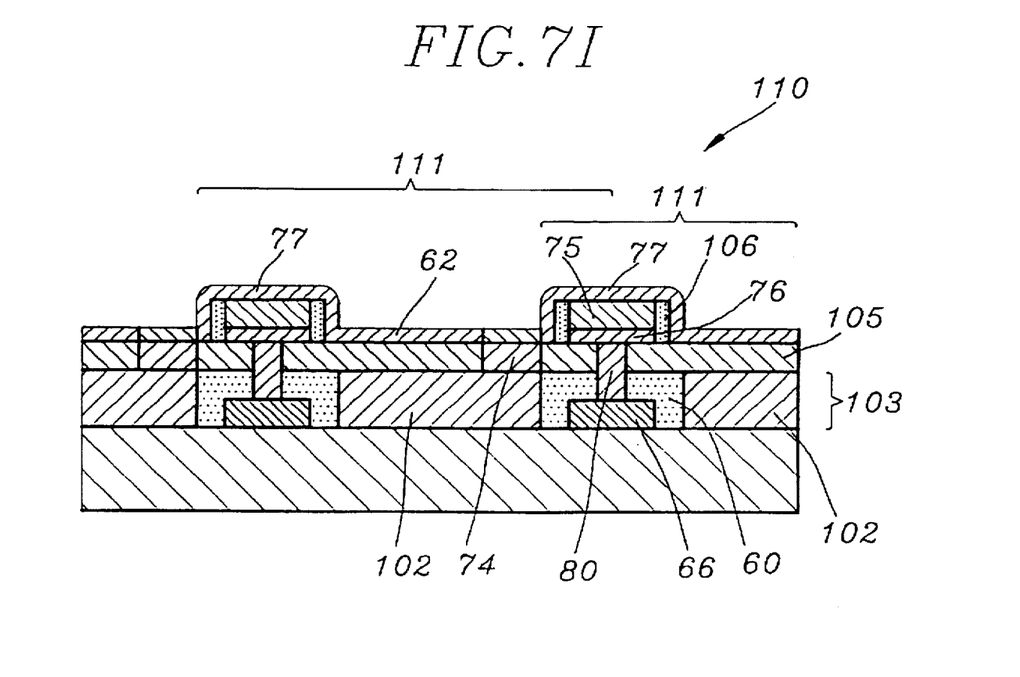

Thereafter, as shown in FIG. 7I, the semifinished array 108 of actuated mirror structure 109 is then patterned into an array 110 of M×N actuated mirror structures 111 using a dry etching method, or photolithography method, each of the actuated mirror structures 111 including on elastic member 54 with a pair of actuating structures 57 and a mirror 62 made of the electrically conducting, light reflecting material formed on top thereof, each of the actuating structures 57 having a bias electrode 77 made of the electrically conducting, light reflecting material, a motion-inducing thin film layer 75 and a signal electrode 76, the elastic member 54 further being provided with a distal and a proximal ends 67, 68, and a top and bottom surfaces 69, 70, the proximal end 68 including a first tab and a second tab portions 71, 72, the first and second tab portions 71, 72 being separated by a retraction 73 therebetween, the distal end 67 including a protrusion 74, each of the actuating structures 57 being placed on top of the first and second tab portions 71, 72, respectively, wherein the protrusion 74 from each of the elastic members 54, and hence, the mirror 62, extends into the retraction 73 of a successive electric members 54.

Figure 7J:
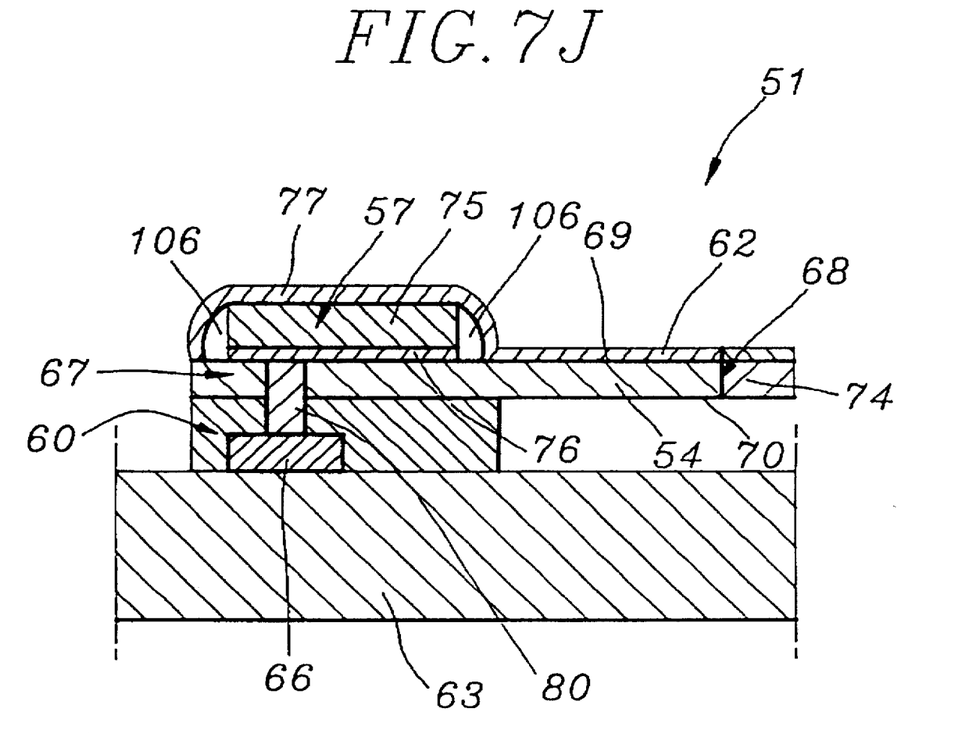

The sacrificial layer is then removed by using an etching method to thereby form the array 50 of M×N thin film actuated mirrors 51 as depicted in FIG. 7J.

The method used in manufacturing of the second embodiment involves similar steps except that it involves a different patterning of the semifinished array 108 of actuated mirror structures 109.

While the present invention has been described with respect to certain preferred embodiments only, other modifications and variations may be made without departing from the scope of the present invention as set forth in the following claims.

What is claimed is:

1. An array of M×N thin film actuated mirrors, wherein M and N are integers, for use in an optical projection system, said array comprising:

an active matrix including a substrate, an array of M×N transistors and an array of M×N pairs of connecting terminals, wherein the connecting terminals in each pair are electrically connected to each of the transistors;

an array of M×N elastic members, each of the elastic members being provided with a distal and a proximal ends, and a top and a bottom surfaces, the proximal end including a first tab and a second tab portions, the first tab and second tab portions being separated by a retraction therebetween, the distal end including a protrusion, wherein the protrusion from each of the elastic members extends into the retraction of a successive elastic member in the array;

an array of M×N pairs of actuating structures, each pair of the actuating structures being located on the first and second tab portions on each of the elastic members, respectively, each of the actuating structures including a bias electrode, a motion-inducing thin film layer and a signal electrode with the bias and the signal electrodes being placed on top and bottom of the motion-inducing thin film layer, respectively, the bias electrode being made of an electrically conducting, light reflecting material, the signal electrode in each of the actuating structures in each pair being electrically connected to a same transistor in the active matrix, wherein an electrical signal applied across the motion-inducing thin film layer between the bias and the signal electrodes in each of the actuating structures causes a deformation of the motion-inducing thin film layer, and hence said each of the actuating structures;

an array of M×N pairs of supporting members, each pair of the supporting members being used for holding each of the elastic members in place, wherein the first and second tab portions in each of the elastic members are secured to each of the supporting members in each pair, respectively;

an array of M×N mirrors for reflecting light beams, each of the mirrors being formed on the top surface of the elastic member, each of the mirrors being made of the same material as the bias electrode, such that when the pair of actuating structures deform in response to the electrical signal, the first and second tab portions on the elastic member with the actuating structures attached thereto tilt while the remainder of the elastic member, and, hence, the mirror formed on top thereof, stays planar, thereby allowing all of the mirror to reflect the light beams.

2. The thin film actuated mirror array of claim 1, wherein each of the supporting members in made of a ceramic.

3. The thin film actuated mirror array of claim 1, wherein each of the elastic members is made of a ceramic.

4. The thin film actuated mirror array of claim 1, wherein each of the thin film actuated mirrors is provided with a pair of conduits, each of the conduits extending from a signal electrode to a corresponding connecting terminal in the active matrix via a supporting member, thereby electrically connecting the signal electrode and the connecting terminal.

5. The thin film actuated mirror array of claim 4, wherein each of the conduits is made of a metal.

6. The thin film actuated mirror array of claim 3, wherein each of the elastic members is provided with a distal and a proximal ends, the proximal and including a first, a second and a center tab portions, the first, second and center tab portions being separated by a gap therebetween.

7. The thin film actuated mirror array of claim 1, wherein each of the signal electrodes and the motion-inducing layer on top thereof are surrounded by an insulation in order to prevent the bias electrode from coming in contact with the signal electrode.

8. The thin film actuated mirror array of claim 1, wherein the motion-inducing thin film layer is made of an electrostrictive material or a piezoelectric material.

9. The thin film actuated mirror array of claim 1, wherein each of the signal electrodes is made of platinum or platinum/titanium.

10. A method for manufacturing an array of M×N thin film actuated mirrors for use in an optical projection system, said method comprising the steps of:

a) providing an active matrix having a top surface, the active matrix including a substrate, an array of M×N transistors and an array of M×N pairs of connecting terminals on the top surface thereof;

b) forming a sacrificial layer on the top surface of the active matrix in such a way that the sacrificial layer completely covers the array of M×N pairs of connecting terminals;

c) removing the sacrificial layer surrounding each of the connecting terminals;

d) forming a supporting member around each of the connecting terminals;

e) depositing an elastic layer on top of the sacrificial layer and supporting members;

f) forming an array of M×N pairs of conduits, each of the conduits extending from top of the elastic layer to each of the connecting terminals via each of the supporting members;

g) providing an array of M×N pairs of signal electrodes on top of the elastic layer in such a way that each of the signal electrodes is in contact with each of the conduits and hence each of the connecting terminals;

h) forming a motion-inducing thin film layer on top of each of the signal electrodes;

i) depositing a layer made of an electrically conducting light reflecting material on top of the motion inducing and elastic layers to thereby form a semifinished array of actuated mirror structures;

j) patterning the semifinished array of actuated mirror structures into an array of M×N actuated mirror structures, each of the actuated mirror structures including a pair of supporting members, a sacrificial layer, an elastic member with a pair of actuating structures and a mirror made of the electrically conducting, light reflecting material formed on top thereof, each of the actuating structures having a bias electrode made of the electrically conducting, light reflecting material, the motion-inducing thin film layer and the signal electrode, the elastic member further being provided with a distal and a proximal ends, and a top and bottom surfaces, the proximal end including a first tab and a second tab portions, the first and second tab portions being separated by a retraction therebetween, the distal end including a protrusion, each of the actuating structures being placed on top of the first and second tab portions, respectively, wherein the protrusion from each of the elastic members, and hence, the actuated mirror structures, extends into the retraction of a successive elastic member, and hence, a successive actuated mirror structure, in the array; and k) removing the sacrificial layer to thereby form said array M×N thin film actuated mirrors.

11. The method of claim 10, wherein the sacrificial layer is made of a metal; or a phosphor silicate glass(PSG) or a poly-Si.

12. The method of claim 11, wherein the sacrificial layer is formed using a chemical vapor deposition (CVD) or a spin coating method if the sacrificial layer is made of a metal, a CVD method if the sacrificial layer is made of a PSG, a CVD method if the sacrificial layer is made of a poly-Si.

13. The method of claim 10, wherein the first supporting layer is formed by using a combination of a photolithography method followed by a sputtering method or a CVD method.

14. The method of claim 10, wherein the signal electrode is formed by using a sputtering method.

15. The method of claim 10, wherein the motion-inducing layer is formed by using a sol-gel method or a sputtering method.

16. The method of claim 10, wherein the bias electrode and the mirror are formed using a sputtering or a vacuum evaporation method.

17. The method of claim 10, wherein the semifinished array of actuated mirror structures is patterned into the array of M×N actuated mirror structures by using a dry etching method or a photolithography method.

18. The method of claim 10, wherein the sacrificial layer is removed by using an etching method.

* * * * *